United States Patent
Li (10) Patent No.: US 12,227,133 B2
(45) Date of Patent: Feb. 18, 2025

(54) ANTI-DAZZLING DISPLAY DEVICE, ANTI-DAZZLING DISPLAY METHOD, AND INTERIOR REARVIEW MIRROR

(71) Applicants: Beijing BOE Technology Development Co., Ltd., Beijing (CN); BOE Technology Group Co., Ltd., Beijing (CN)

(72) Inventor: Wenbo Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 713 days.

(21) Appl. No.: 17/435,047

(22) PCT Filed: Feb. 10, 2021

(86) PCT No.: PCT/CN2021/076541
§ 371 (c)(1),
(2) Date: Aug. 31, 2021

(87) PCT Pub. No.: WO2021/218295
PCT Pub. Date: Nov. 4, 2021

(65) Prior Publication Data
US 2022/0324385 A1    Oct. 13, 2022

(30) Foreign Application Priority Data
Apr. 30, 2020   (CN) .......................... 202010367834.1

(51) Int. Cl.
*B60R 1/08*    (2006.01)
(52) U.S. Cl.
CPC .............. *B60R 1/088* (2013.01); *B60R 1/087* (2013.01)

(58) Field of Classification Search
CPC .. B60R 1/12; B60R 1/083; B60R 1/02; B60R 1/08; B60R 1/085; B60R 1/086; B60R 1/087
See application file for complete search history.

(56) References Cited

U.S. PATENT DOCUMENTS

| | | | |
|---|---|---|---|
| 2006/0245025 A1* | 11/2006 | Tonar | B60R 1/08 359/265 |
| 2009/0115012 A1* | 5/2009 | Yoon | H01L 31/02327 257/E31.127 |

(Continued)

FOREIGN PATENT DOCUMENTS

| | | |
|---|---|---|
| CN | 101576681 A | 11/2009 |
| CN | 102736332 A | 10/2012 |

(Continued)

OTHER PUBLICATIONS

International Search Report for PCT/CN2021/076541 Mailed May 10, 2021.

(Continued)

*Primary Examiner* — Christopher Stanford
*Assistant Examiner* — Journey F Sumlar
(74) *Attorney, Agent, or Firm* — Ling Wu; Stephen Yang; Ling and Yang Intellectual Property (57) ABSTRACT

Provided are an anti-dazzling display device, an anti-dazzling display method, and an interior rearview mirror. The anti-dazzling display device includes a sensor unit, a display unit, and an anti-dazzling unit on a light exit side of the display unit. The anti-dazzling unit is configured to adjust a reflectivity of incident ambient light and a transmittance of image light exited from the display unit in response to a light intensity of ambient light sensed by the sensor unit.

9 Claims, 7 Drawing Sheets

(56) References Cited

U.S. PATENT DOCUMENTS

| | | |
|---|---|---|
| 2009/0268273 A1 | 10/2009 | Powers et al. |
| 2009/0303566 A1* | 12/2009 | Tonar ..................... B60R 1/088 359/267 |
| 2011/0273659 A1 | 11/2011 | Sobecki |
| 2016/0200256 A1 | 7/2016 | Takada et al. |
| 2019/0351827 A1 | 11/2019 | Xue et al. |
| 2020/0018997 A1 | 1/2020 | Weindorf |

FOREIGN PATENT DOCUMENTS

| | | |
|---|---|---|
| CN | 203093901 U | 7/2013 |
| CN | 103513305 A | 1/2014 |
| CN | 105788476 A | 7/2016 |
| CN | 106184016 A | 12/2016 |
| CN | 108303812 A | 7/2018 |
| CN | 110053560 A | 7/2019 |
| CN | 111439204 A | 7/2020 |
| EP | 0111907 A2 | 6/1984 |
| EP | 0568210 A1 | 11/1993 |
| JP | 2005-53468 A | 3/2005 |
| WO | 2004008269 A3 | 1/2004 |
| WO | 2013116460 A1 | 8/2013 |

OTHER PUBLICATIONS

Office Action dated Apr. 1, 2021 for Chinese Patent Application No. 202010367834.1 and English Translation.

\* cited by examiner

ANTI-DAZZLING DISPLAY DEVICE, ANTI-DAZZLING DISPLAY METHOD, AND INTERIOR REARVIEW MIRROR

CROSS-REFERENCE TO RELATED APPLICATIONS

The present application is a U.S. National Phase Entry of International Application No. PCT/CN2021/076541 having an international filing date of Feb. 10, 2021, which claims priority to Chinese patent application No. 202010367834.1 filed on Apr. 30, 2020, and entitled "Anti-dazzling Display Device, Anti-dazzling Display Method, and Interior Rearview Mirror". The above-identified applications are hereby incorporated by reference in their entirety.

TECHNICAL FIELD

Embodiments of the present disclosure relate, but are not limited to, the technical field of display, and particularly to an anti-dazzling display device, an anti-dazzling display method, and an interior rearview mirror.

BACKGROUND

At present, a vehicle-mounted display screen configured to display vehicle instrument parameters to a person in a vehicle or display an entertainment program to the person in the vehicle is usually arranged in the vehicle to improve the convenience and comfortability for use of the vehicle. The vehicle-mounted display screen is usually suspended on an instrument desk of the vehicle on the right side of the cab, with a surface fixed substantially flush with a plastic panel of the cab. In daily use of the vehicle, the vehicle-mounted display screen easily reflects light in either on or off state. Particularly in summer, relatively strong reflected light may easily dazzle a driver such that the driver cannot view a content on the vehicle-mounted display screen clearly, which is harmful to the driving safety.

SUMMARY

The below is a summary about the subject matter described in the present disclosure in detail. The summary is not intended to limit the scope of protection of the claims.

According to a first aspect, an embodiment of the present disclosure provides an anti-dazzling display device, which includes a sensor unit, a display unit, and an anti-dazzling unit on a light exit side of the display unit.

The anti-dazzling unit is configured to adjust a reflectivity of incident ambient light and a transmittance of image light exited from the display unit in response to a light intensity of ambient light sensed by the sensor unit.

In an exemplary embodiment, the anti-dazzling unit includes an anti-dazzling liquid crystal screen and a semi-reflection semi-transmission film. The semi-reflection semi-transmission film is between the anti-dazzling liquid crystal screen and the display unit. The anti-dazzling liquid crystal screen is configured to be loaded with a preset voltage at an initial moment to be a balance state of the reflectivity and the transmittance.

In an exemplary embodiment, the sensor unit includes a first light-sensitive sensor, a second light-sensitive sensor, and a first controller.

The first light-sensitive sensor is on a light exit side of the anti-dazzling unit.

The second light-sensitive sensor is on a side of the display unit away from the semi-reflection semi-transmission film.

The first controller is configured to control a voltage loaded to the anti-dazzling liquid crystal screen according to a light intensity sensed by the first light-sensitive sensor and a light intensity sensed by the second light-sensitive sensor to control the reflectivity and the transmittance.

In an exemplary embodiment, the sensor unit includes a third light-sensitive sensor and a second controller.

The third light-sensitive sensor is on a light exit side of the anti-dazzling unit.

The second controller is configured to control a voltage loaded to the anti-dazzling liquid crystal screen according to a light intensity sensed by the third light-sensitive sensor to control the reflectivity and the transmittance.

In an exemplary embodiment, the anti-dazzling liquid crystal screen is an advanced super dimension switch technology-based liquid crystal display screen, and is configured to adjust a polarization state of incident light in response to a loaded voltage.

In an exemplary embodiment, the display unit includes a display panel, a first polarizer on a side of the display panel away from the semi-reflection semi-transmission film, and a second polarizer on a side of the display panel close to the semi-reflection semi-transmission film. The anti-dazzling liquid crystal screen includes a third polarizer on a side of liquid crystal molecules in the anti-dazzling liquid crystal screen away from the semi-reflection semi-transmission film. An absorption axis of the first polarizer is orthogonal to an absorption axis of the second polarizer. The absorption axis of the second polarizer is orthogonal to an absorption axis of the third polarizer. A transmission axis of the half reflection half reflection film is orthogonal to the absorption axis of the second polarizer.

Or, the display unit consists of a display panel and a first polarizer on a side of the display panel away from the semi-reflection semi-transmission film. The anti-dazzling liquid crystal screen further includes a third polarizer on a side of liquid crystal molecules thereof away from the semi-reflection semi-transmission film. An absorption axis of the first polarizer is the same as an absorption axis of the third polarizer. A transmission axis of the semi-reflection semi-transmission film is the same as the absorption axis of the first polarizer.

In an exemplary embodiment, the anti-dazzling liquid crystal screen further includes a first substrate and second substrate which are on two sides of liquid crystal molecules in the anti-dazzling liquid crystal screen.

The first substrate includes a first electrode region, including a shield electrode on a side of the liquid crystal molecules away from the semi-reflection semi-transmission film.

The second substrate includes a second electrode region, including a pixel electrode, an insulating layer, and a common electrode which are stacked.

The pixel electrode is on a side of the insulating layer close to the semi-reflection semi-transmission film, and the common electrode is on a side of the insulating layer away from the semi-reflection semi-transmission film.

Or, the pixel electrode is on a side of the insulating layer away from the semi-reflection semi-transmission film, and the common electrode is on a side of the insulating layer close to the semi-reflection semi-transmission film.

In an exemplary embodiment, the anti-dazzling liquid crystal screen further includes a first region and a second region except the first region.

The first region is configured to adjust the reflectivity of the incident ambient light in response to the light intensity of the ambient light sensed by the sensor unit.

The second region is configured to adjust the transmittance of the image light exited from the display unit in response to the light intensity of the ambient light sensed by the sensor unit.

In an exemplary embodiment, the anti-dazzling liquid crystal screen is a twisted nematic liquid crystal display screen, and is configured to adjust a polarization state of incident light in response to a loaded voltage.

In an exemplary embodiment, the display unit includes a display panel, a fourth polarizer on a side of the display panel away from the semi-reflection semi-transmission film, and a fifth polarizer on a side of the display panel close to the semi-reflection semi-transmission film. The anti-dazzling liquid crystal screen further includes a sixth polarizer on a side of liquid crystal molecules in the anti-dazzling liquid crystal screen away from the semi-reflection semi-transmission film.

An absorption axis of the fourth polarizer is orthogonal to an absorption axis of the fifth polarizer. The absorption axis of the fifth polarizer is parallel to an absorption axis of the sixth polarizer. A transmission axis of the half reflection half reflection film is orthogonal to the absorption axis of the sixth polarizer.

Or, the display unit consists of a display panel and a fourth polarizer on a side of the display panel away from the semi-reflection semi-transmission film. The anti-dazzling liquid crystal screen further includes a sixth polarizer on a side of liquid crystal molecules in the anti-dazzling liquid crystal screen away from the semi-reflection semi-transmission film.

An absorption axis of the fourth polarizer is orthogonal to an absorption axis of the sixth polarizer.

A transmission axis of the semi-reflection semi-transmission film is orthogonal to the absorption axis of the sixth polarizer.

According to a second aspect, an embodiment of the present disclosure provides an anti-dazzling display method based on the anti-dazzling display device as described in the abovementioned embodiment, which includes the following operations.

The sensor unit senses ambient light and outputs a light intensity.

The anti-dazzling unit adjusts the reflectivity of the incident ambient light and the transmittance of image light exited from a display unit in response to the light intensity.

In an exemplary embodiment, the anti-dazzling unit includes an anti-dazzling liquid crystal screen and a semi-reflection semi-transmission film between the anti-dazzling liquid crystal screen and the display unit. Before the sensor unit senses the ambient light and outputs the light intensity, the anti-dazzling display method further includes a preset voltage is loaded to the anti-dazzling liquid crystal screen to make the anti-dazzling liquid crystal screen be in a balance state of the reflectivity and the transmittance.

According to a third aspect, an embodiment of the present disclosure provides an interior rearview mirror, which includes the anti-dazzling display device as described in the abovementioned embodiment.

After the drawings and the detailed descriptions are read and understood, the other aspects may be comprehended.

BRIEF DESCRIPTION OF DRAWINGS

In order to describe the technical solutions in the embodiments of the present disclosure more clearly, the drawings required to be used in the description of the embodiments will now be simply introduced. The drawings in the following description are only some embodiments of the present disclosure. Those of ordinary skill in the art may further obtain other drawings according to these drawings without creative work.

DETAILED DESCRIPTION

The technical solutions of the present disclosure will now be described in combination with exemplary embodiments and the drawings. Similar components in the drawings are represented with the same reference signs. It can be understood by those skilled in the art that the contents described below are exemplary and nonrestrictive and should not limit the scope of protection of the present disclosure.

"On . . . ", "formed on . . . ", and "arranged on . . . " used in the present disclosure may represent that a layer is directly formed or arranged on another layer, or, a layer is indirectly formed or arranged on another layer, namely there may be another layer between the two layers.

Figure 1:
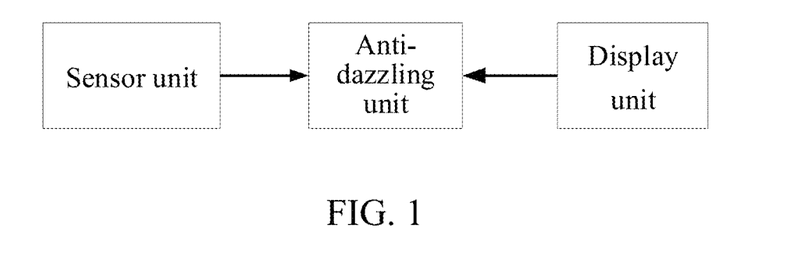
FIG. 1 is a structural schematic diagram of an anti-dazzling display device according to an embodiment of the present disclosure.

An embodiment of the present disclosure provides an anti-dazzling display device. As shown in FIG. 1, the anti-dazzling display device may include a sensor unit, a display unit, and an anti-dazzling unit on a light exit side of the display unit. The anti-dazzling unit is configured to adjust reflectivity of incident ambient light and transmittance of image light exited from the display unit in response to a light intensity of ambient light sensed by the sensor unit.

In an exemplary embodiment, light path control is performed on the ambient light entering the anti-dazzling unit and the image light exited from the display unit through the anti-dazzling unit according to the light intensity of the ambient light sensed by the sensor unit. As such, under a condition of dazzling ambient light, the reflectivity may be adjusted to reduce the reflection of the incident ambient light, and the transmittance may be adjusted to display the image light. Therefore, viewing experience of a driver and driving safety are improved.

Figure 2A:
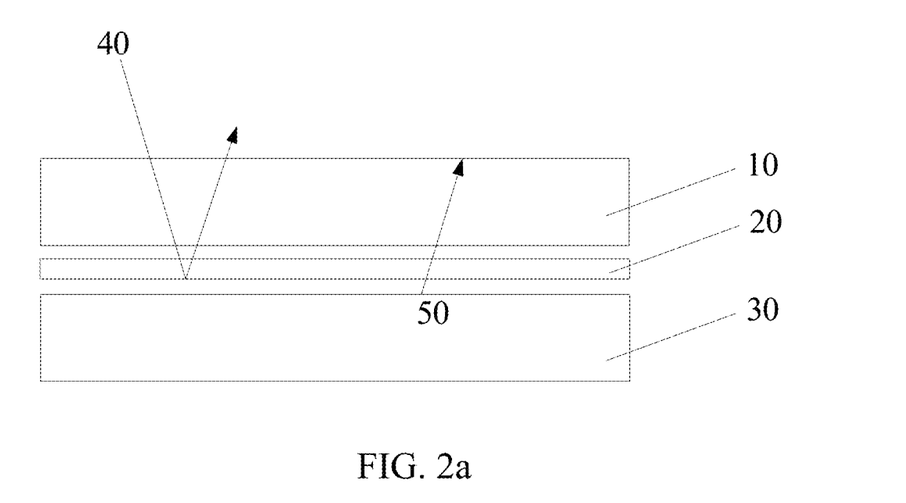
FIG. 2a is a schematic diagram of a light path of an anti-dazzling display device according to an embodiment of the present disclosure.
Figure 2B:
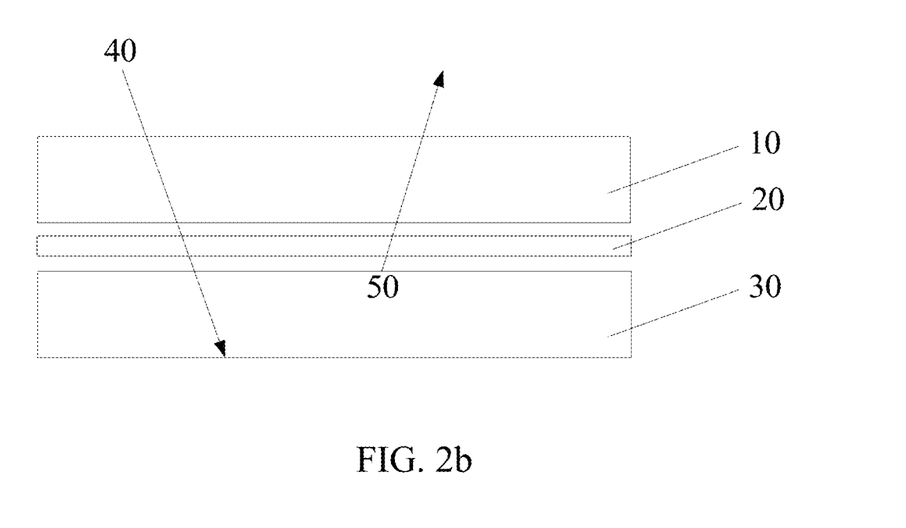
FIG. 2b is a schematic diagram of another light path of an anti-dazzling display device according to an embodiment of the present disclosure.

In an exemplary embodiment, as shown in FIGS. 2a and 2b, the anti-dazzling unit may include an anti-dazzling liquid crystal screen 10 and a semi-reflection semi-transmission film 20, and the semi-reflection semi-transmission film 20 is between the anti-dazzling liquid crystal screen 10 and the display unit 30. The anti-dazzling liquid crystal screen 10 adjusts a polarization state of the incident light 40 and a polarization state of the image light 50 exited from the display unit 30 in response to a voltage loaded to the anti-dazzling liquid crystal screen 10. The semi-reflection semi-transmission film 20 is configured to reflect polarized light perpendicular to a transmission axis of the semi-reflection semi-transmission film 20 or transmit polarized light parallel to a transmission axis of the semi-reflection semi-transmission film 20.

In an exemplary embodiment, the anti-dazzling unit is configured to control the voltage loaded to the anti-dazzling liquid crystal screen according to the light intensity sensed by the sensor unit to adjust the polarization state of the incident ambient light and adjust the reflection of the incident ambient light through the semi-reflection semi-transmission film. Similarly, the voltage loaded to the anti-dazzling liquid crystal screen is controlled to adjust the polarization state of the image light transmitted by the semi-reflection semi-transmission film. Therefore, an anti-dazzling function and a display function are realized.

The light path control of the anti-dazzling display device will now be described with two extreme cases presented by the anti-dazzling unit, i.e., cases of light paths when the anti-dazzling unit is in an anti-dazzling state and display state.

In the anti-dazzling state, as shown in FIG. 2a, the ambient light 40 enters the anti-dazzling liquid crystal screen 10 of the anti-dazzling display device. By use of the characteristic of selective reflection and transmission of the semi-reflection semi-transmission film 20, the anti-dazzling liquid crystal screen 10 adjusts the polarization state of the incident light 40 in response to the voltage loaded thereto, and adjusts the incident light 40 into first polarized light perpendicular to the transmission axis of the semi-reflection semi-transmission film 20, the first polarized light is reflected by the semi-reflection semi-transmission film 20 and exited from the anti-dazzling liquid crystal screen 10. That is, the reflectivity of the anti-dazzling unit is controlled to reduce the light intensity of the incident ambient light, thereby realizing the anti-dazzling function. Moreover, the anti-dazzling liquid crystal screen 10 may absorb the image light 50 which is transmitted by the semi-reflection semi-transmission film 20 and exited from the display unit 30.

In the display state, as shown in FIG. 2b, the ambient light 40 enters the anti-dazzling liquid crystal screen 10 of the anti-dazzling display device. By use of the characteristic of selective reflection and transmission of the semi-reflection semi-transmission film 20, the anti-dazzling liquid crystal screen 10 adjusts the polarization state of the incident light 40 in response to the voltage loaded thereto, and adjusts the incident light 40 into second polarized light parallel to the transmission axis of the semi-reflection semi-transmission film 20, the second polarized light is transmitted into the display unit 30 by the semi-reflection semi-transmission film 20 and absorbed by the display unit 30. Meanwhile, the image light 50 which is transmitted by the semi-reflection semi-transmission film 20 and exited from the display unit 30 enters the anti-dazzling liquid crystal screen 10. The anti-dazzling liquid crystal screen 10 adjusts the polarization state of the image light in response to the voltage loaded thereto and exits the image light. That is, the transmittance of the anti-dazzling unit is controlled to implement the transmission of the image light, thereby realizing the display function.

Figure 3:
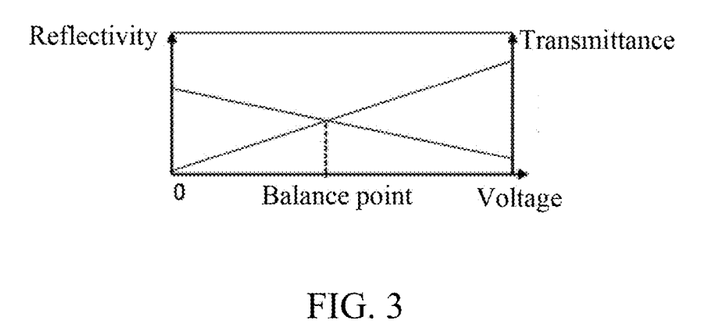
FIG. 3 is a schematic diagram of a balance point of an anti-dazzling liquid crystal screen according to an embodiment of the present disclosure.

Considering that the anti-dazzling function and the display function may be simultaneously realized in practical applications, the reflectivity and transmittance of the anti-dazzling unit may be simultaneously adjusted. Controlling the voltage loaded to the anti-dazzling unit may influence the reflectivity and transmittance of the anti-dazzling unit. For example, FIG. 3 is a schematic diagram of influence on the reflectivity and transmittance of the anti-dazzling unit by controlling the voltage loaded to the anti-dazzling unit according to an exemplary embodiment. When the voltage loaded to the anti-dazzling unit gradually increases, the reflectivity tends to decrease, and the transmittance tends to increase. Moreover, tests in an ordinary environment show that there is a balance point between a changing curve of the reflectivity and a changing curve of the transmittance, and the best anti-dazzling function and display function are realized at the balance point of the reflectivity and the transmittance.

Therefore, those skilled in the art may make a corresponding setting according to the influence of the voltage loaded to the anti-dazzling liquid crystal screen on the reflectivity and the transmittance in practical applications to determine an appropriate balance point. Elaborations are omitted herein.

In an optional embodiment, the anti-dazzling unit may include an anti-dazzling liquid crystal screen and a semi-reflection semi-transmission film. The semi-reflection semi-transmission film is between the anti-dazzling liquid crystal screen and the display unit. The anti-dazzling liquid crystal screen is configured to be loaded with a preset voltage at an initial moment to be in a balance state of the reflectivity and the transmittance.

In an exemplary embodiment, a control voltage corresponding to a balance point of the reflectivity and the transmittance is set as a preset voltage for the anti-dazzling unit and an influence trend of the loaded voltage on the reflectivity and the transmittance. The preset voltage is loaded to the anti-dazzling liquid crystal screen at the initial moment to make the anti-dazzling liquid crystal screen in the balance state, that is, the anti-dazzling liquid crystal screen is configured to realize the best anti-dazzling function and display function in an ordinary environment.

In such way, the voltage loaded to the anti-dazzling liquid crystal screen is adjusted on the basis of the balance state according to the light intensity of the ambient light sensed by the sensor unit and, thereby quickly responding to the adjustment of the anti-dazzling unit and avoiding the potential safety hazard caused by untimely anti-dazzling adjustment in a driving process of a vehicle.

In an exemplary embodiment, descriptions are still made by taking the anti-dazzling liquid crystal screen shown in FIG. 3 as an example. The voltage loaded to the anti-dazzling liquid crystal screen may be increased to reduce the reflectivity when the light intensity of the ambient light is relatively high and the reflectivity is desired to be adjusted. Similarly, the voltage loaded to the anti-dazzling liquid crystal screen may be reduced to reduce the transmittance when the anti-dazzling liquid crystal screen is desired to realize a better mirror function. Therefore, the voltage loaded to the anti-dazzling liquid crystal screen at the initial moment is set as a balance point voltage achieving a relative balance of the reflectivity and the transmittance, and the voltage loaded to the anti-dazzling liquid crystal screen may be adjusted to implement the fine adjustment of the reflectivity and the transmittance.

Here, the initial moment in the embodiments of the present disclosure may be not limited to a specific time point, it may be a moment when the anti-dazzling display device is powered on or under mode switching, for example, the anti-dazzling display device is set as a pure display mode, or a pure reflection mode, or an automatic adjustment mode, etc. No limits are made thereto in the present disclosure. Those skilled in the art may take a design criterion in which an appropriate initial moment and an appropriate voltage loaded to the anti-dazzling liquid crystal screen are selected according to practical application requirements to achieve appropriate reflectivity and transmittance. Elaborations are omitted herein.

Figure 4:
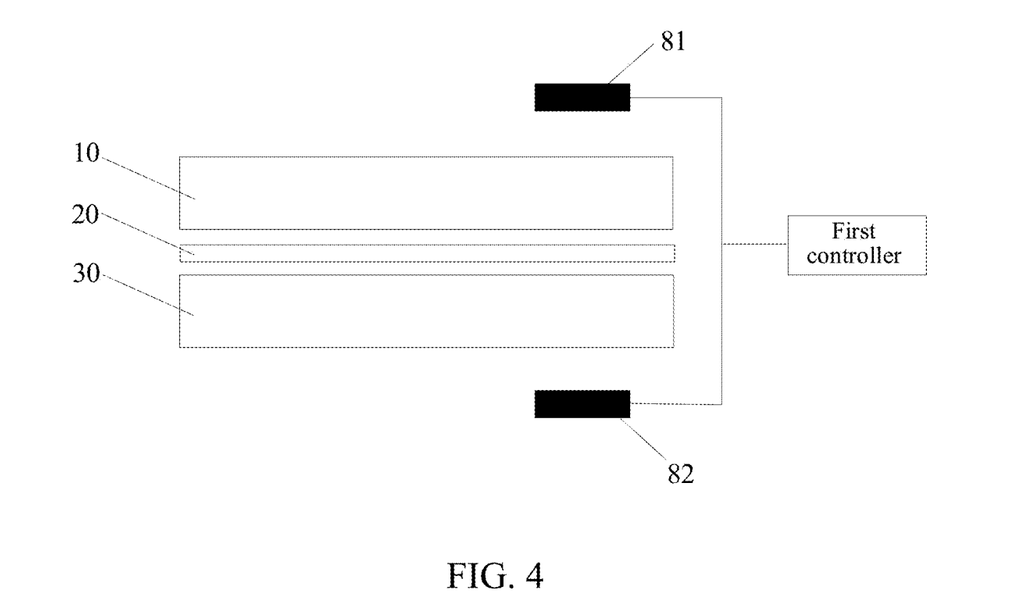
FIG. 4 is a structural schematic diagram of an anti-dazzling liquid crystal screen according to an embodiment of the present disclosure.

In an optional embodiment, as shown in FIG. 4, the sensor unit may include a first light-sensitive sensor 81, a second light-sensitive sensor 82, and a first controller. The first light-sensitive sensor 81 is on a light exit side of the anti-dazzling unit. The second light-sensitive sensor 82 is on a side of the display unit 30 away from the semi-reflection semi-transmission film 20. The first controller is configured to control a voltage loaded to the anti-dazzling liquid crystal screen 10 according to a light intensity sensed by the first light-sensitive sensor 81 and a light intensity sensed by the second light-sensitive sensor 82 to control the reflectivity and the transmittance.

In an exemplary embodiment, as shown in FIG. 4, when the light intensity sensed by the first light-sensitive sensor 81 is greater than the light intensity sensed by the second light-sensitive sensor 82 or the light intensity sensed by the first light-sensitive sensor 81 is greater than the light intensity sensed by the second light-sensitive sensor 82 and reaches a preset threshold, the voltage is applied to the anti-dazzling liquid crystal screen 10, for example, the voltage loaded to the anti-dazzling liquid crystal screen 10 is increased to reduce the reflectivity. Therefore, the dazzling influence caused by the relatively high light intensity of the incident reflected light is reduced.

Figure 5:
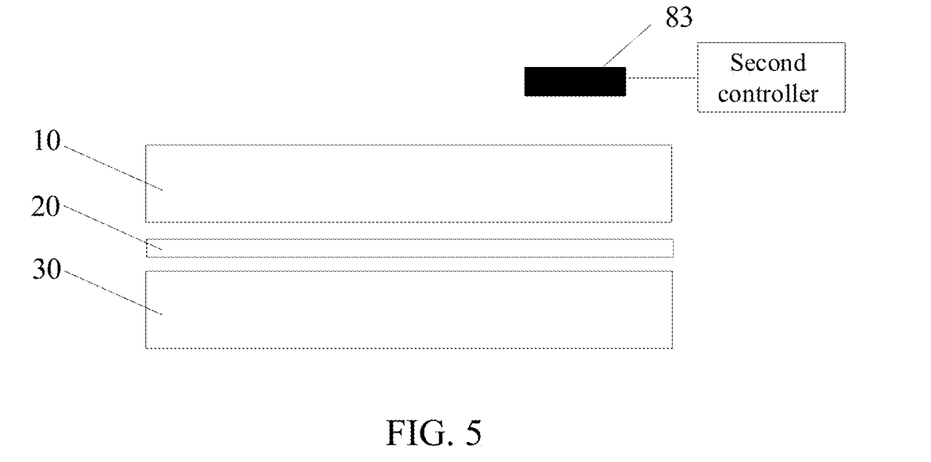
FIG. 5 is another structural schematic diagram of an anti-dazzling liquid crystal screen according to an embodiment of the present disclosure.

In another optional embodiment, as shown in FIG. 5, the sensor unit may include a third light-sensitive sensor 83 and a second controller. The third light-sensitive sensor 83 is on a light exit side of the anti-dazzling unit. The second controller is configured to control a voltage loaded to the anti-dazzling liquid crystal screen 10 according to a light intensity sensed by the third light-sensitive sensor 83 to control the reflectivity and the transmittance.

Figure 6:
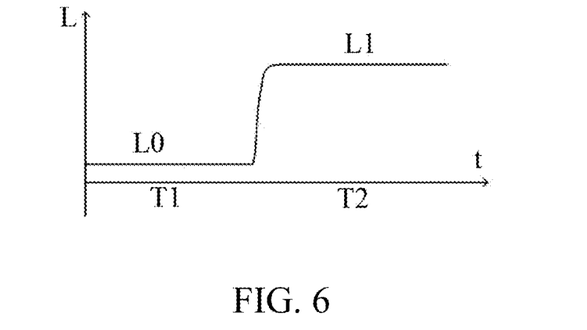
FIG. 6 is a schematic diagram of light sensing of an anti-dazzling liquid crystal screen according to an embodiment of the present disclosure.

In an exemplary embodiment, as shown in FIG. 6, a light-sensitive sensor is used to continuously acquire a light intensity of light, thereby acquiring an oscillogram of the light intensity and the time. For example, a first light intensity sensed by the third light-sensitive sensor 83 in period T1 is L0, and a second light intensity sensed by the third light-sensitive sensor 83 in period T2 is L1. In such case, an anti-dazzling design may be performed according to the first light intensity L0 and the second light intensity L1.

For example, an anti-dazzling design may be performed according to a difference between the first light intensity L0 and the second light intensity L1. The voltage loaded to the anti-dazzling liquid crystal screen may be increased when the difference is greater than a preset difference threshold and is a positive. Alternatively, the voltage loaded to the anti-dazzling liquid crystal screen may be reduced when the difference is greater than a preset difference threshold and is a negative.

For another example, an anti-dazzling design may be performed according to a ratio of the first light intensity L0 to the second light intensity L1. The voltage loaded to the anti-dazzling liquid crystal screen may be increased when the ratio is greater than a preset ratio threshold. Alternatively, the voltage loaded to the anti-dazzling liquid crystal screen may be reduced when the ratio is not greater than a preset ratio threshold.

Here, no limits are made thereto in the present disclosure. Those skilled in the art may select an appropriate manner to measure changes of the light intensity of the ambient light according to a practical application requirement and adjust the voltage loaded to the anti-dazzling liquid crystal screen according to the changes to realize the anti-dazzling function and the display function. Elaborations are omitted herein.

In an optional embodiment, the anti-dazzling liquid crystal screen may be an advanced super dimension switch technology-based liquid crystal display screen, and is configured to adjust a polarization state of the incident light in response to the loaded voltage. Therefore, the advanced super dimension switch technology-based liquid crystal display screen may be combined with the semi-reflection semi-transmission film to implement light path control to realize the anti-dazzling function and the display function.

Figure 7A:
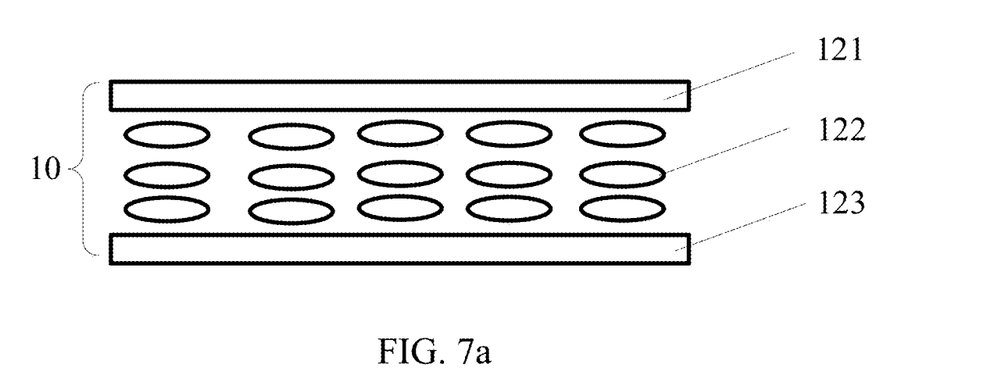
FIG. 7a is another structural schematic diagram of an anti-dazzling liquid crystal screen according to an embodiment of the present disclosure.
Figure 7B:
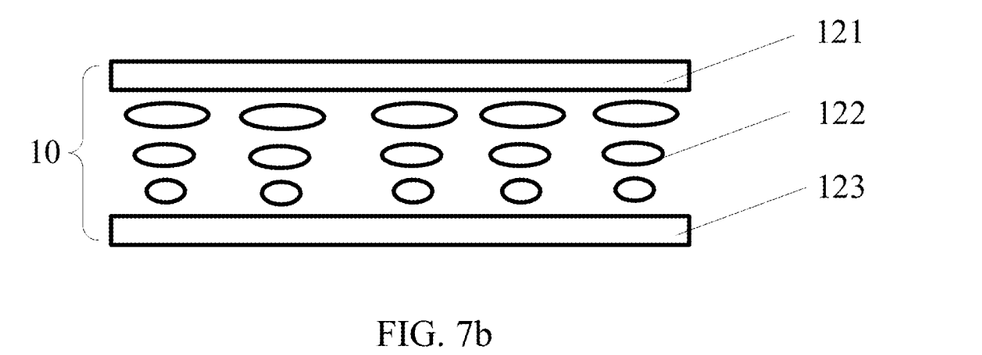
FIG. 7b is still another structural schematic diagram of an anti-dazzling liquid crystal screen according to an embodiment of the present disclosure.

In an exemplary embodiment, a display panel may be an advanced super dimension switch technology-based color liquid crystal display screen, and the anti-dazzling liquid crystal screen may be an advanced super dimension switch technology-based black-and-white liquid crystal display screen. The advanced super dimension switch technology-based black-and-white liquid crystal display screen is configured to present different states of liquid crystal molecules in response to different loaded voltages. For example, descriptions are made with two extreme cases presented by the anti-dazzling unit. As shown in FIG. 7a, when a voltage loaded to a first electrode 121 and second electrode 123 of the anti-dazzling liquid crystal screen 10 is 0V, liquid crystal molecules 122 of the anti-dazzling liquid crystal screen 10 is in a normal state in which the polarization state of the incident light is not changed. As shown in FIG. 7b, when the voltage loaded to the first electrode 121 and second electrode 123 of the anti-dazzling liquid crystal screen 10 is 5V, the liquid crystal molecule 122 of the anti-dazzling liquid crystal screen 10 is in an angle-twisted state in which the polarization state of the incident light may be changed.

Figure 8:
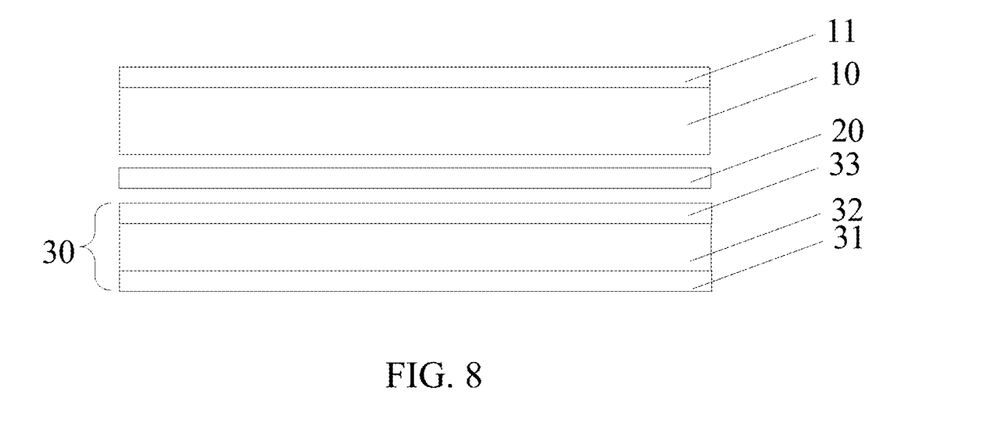
FIG. 8 is another structural schematic diagram of an anti-dazzling display device according to an embodiment of the present disclosure.

In an optional embodiment, as shown in FIG. 8, the display unit 30 may include a display panel 32, a first polarizer 31 on a side of the display panel 32 away from the semi-reflection semi-transmission film 20, and a second polarizer 33 on a side of the display panel 32 close to the semi-reflection semi-transmission film 20. The anti-dazzling liquid crystal screen 10 may further include a third polarizer 11 on a side of liquid crystal molecules in the anti-dazzling liquid crystal screen 10 away from the semi-reflection semi-transmission film 20. An absorption axis of the first polarizer 31 is orthogonal to an absorption axis of the second polarizer 32. The absorption axis of the second polarizer 32 is orthogonal to an absorption axis of the third polarizer 11. A transmission axis of the half reflection half reflection film 20 is orthogonal to the absorption axis of the second polarizer 32.

In an exemplary embodiment, the absorption axis of the first polarizer 31 may be 90 degrees, namely, light in a polarization state of 90 degrees is absorbed. The absorption axis of the second polarizer 33 may be 0 degree, namely, light in a polarization state of 0 degree is absorbed. The absorption axis of the third polarizer 11 may be 90 degrees, namely, light in the polarization state of 90 degrees is absorbed. The transmission axis of the semi-reflection semi-transmission film 20 may be 90 degrees, namely, light in the polarization state of 90 degrees is transmitted. Therefore, the first polarizer, the second polarizer, the anti-dazzling liquid crystal screen, and the third polarizer may be combined with the semi-reflection semi-transmission film to implement light path control in the embodiment of the present disclosure.

Here, the degrees of the absorption axis of the first polarizer, the degrees of the absorption axis of the second polarizer, the degrees of the absorption axis of the third polarizer, and the degrees of the transmission axis of the semi-reflection semi-transmission axis are not limited in the embodiment of the present disclosure. Those skilled in the art may take a design criterion in which a setting is made according to a practical application requirement to satisfy the light path control of the anti-dazzling display device. Elaborations are omitted herein.

In an exemplary embodiment, the light path control of the anti-dazzling display device is described still with the two extreme cases presented by the anti-dazzling unit, i.e., the light path cases when the anti-dazzling unit is in the anti-dazzling state and display state.

Figure 9A:
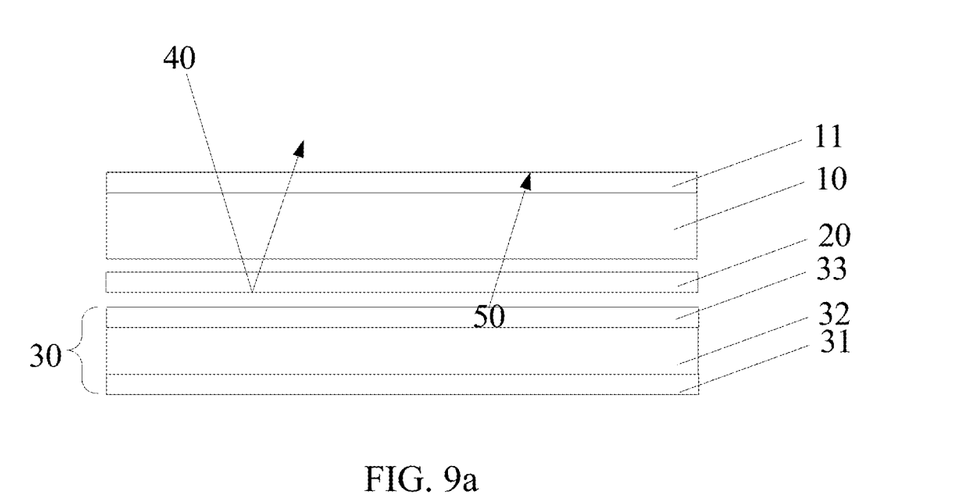
FIG. 9a is a schematic diagram of still another light path of an anti-dazzling display device according to an embodiment of the present disclosure.

For example, in the anti-dazzling state, as shown in FIG. 9a, on one aspect, the ambient light 40 enters the anti-dazzling liquid crystal screen 10 of the anti-dazzling display device.

According to the characteristic of a polarizer, light parallel to an absorption axis thereof is absorbed, and light perpendicular to the absorption axis thereof is transmitted. The absorption axis of the third polarizer 11 may be 90 degrees, so that the third polarizer 11 may absorb vertical light of the ambient light 40 and transmit horizontal light of the ambient light 40.

The anti-dazzling liquid crystal screen 10 may adjust the polarization state of the incident light 40 into polarized light perpendicular to the transmission axis of the semi-reflection semi-transmission film 20. Considering the characteristic of the anti-dazzling liquid crystal screen, the voltage loaded to the anti-dazzling liquid crystal screen may be set to 0, namely, the polarization state of the horizontal light is not changed, and the output first polarized light is the horizontal light.

The transmission axis of the semi-reflection semi-transmission film 20 may be 90 degrees. According to the characteristic of selective reflection and transmission of the semi-reflection semi-transmission film 20, the first polarized light is the horizontal light. In such case, the semi-reflection semi-transmission film realizes a reflection function, and reflects the horizontal light.

The horizontal light passes through the anti-dazzling liquid crystal screen 10 again, and the polarization state of the horizontal light keeps unchanged. In such case, the horizontal light may exit from the third polarizer 11 since the absorption axis of the third polarizer 11 is 90 degrees.

On the other aspect, the image light 50 displayed by the display unit 30 enters the second polarizer 33. The absorption axis of the second polarizer 33 may be 0 degree, so that horizontal light of the image light 50 is absorbed, and vertical light of the image light 50 is transmitted.

The transmission axis of the semi-reflection semi-transmission film 20 may be 90 degrees, so that the vertical light of the image light 50 is transmitted from the semi-reflection semi-transmission film 20 to the anti-dazzling liquid crystal screen 10.

Voltage 0V is loaded to the anti-dazzling liquid crystal screen 10, and the polarization state of the vertical light of the image light 50 is not changed. In such case, since the absorption axis of the third polarizer 11 is 90 degrees, the vertical light of the image light 50 is absorbed, and the image light 50 cannot exit from the anti-dazzling liquid crystal screen.

Thereby, the voltage loaded to the anti-dazzling liquid crystal screen may be controlled to reduce the reflectivity of the anti-dazzling unit to realize the anti-dazzling function.

Figure 9B:
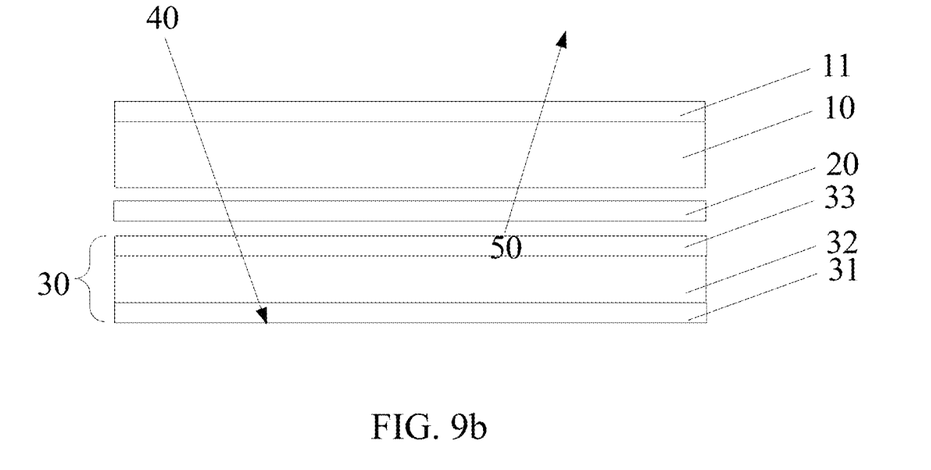
FIG. 9b is a schematic diagram of further still another light path of an anti-dazzling display device according to an embodiment of the present disclosure.

For another example, in the display state, as shown in FIG. 9b, on one aspect, the ambient light 40 enters the anti-dazzling liquid crystal screen 10 of the anti-dazzling display device.

The absorption axis of the third polarizer 11 may be 90 degrees, so that the third polarizer 11 absorbs vertical light of the ambient light 40 and transmits horizontal light of the ambient light 40.

In order to adjust the polarization state of the incident light 40 into polarized light parallel to the transmission axis of the semi-reflection semi-transmission film 20, considering the characteristic of the anti-dazzling liquid crystal screen 10, the voltage loaded to the anti-dazzling liquid crystal screen 10 may be set to 5V, namely the polarization state of the horizontal light is changed, and the output first polarized light is the vertical light.

The transmission axis of the semi-reflection semi-transmission film 20 may be 90 degrees. According to the characteristic of selective reflection and transmission of the semi-reflection semi-transmission film 20, the first polarized light is the horizontal light. In such case, the semi-reflection semi-transmission film realizes a transmission function, and transmits the vertical light.

The absorption axis of the second polarizer 33 may be 0 degree, and the vertical light is transmitted. In such case, the vertical light passes through the display panel and reaches the first polarizer.

The absorption axis of the first polarizer may be 90 degrees, and the vertical light is absorbed. In such case, the ambient light entering the anti-dazzling display device is completely absorbed.

On the other aspect, the image light 50 displayed by the display unit 30 enters the second polarizer 33. The absorption axis of the second polarizer 33 may be 0 degree, so that horizontal light of the image light 50 is absorbed, and vertical light of the image light 50 is transmitted.

The transmission axis of the semi-reflection semi-transmission film 20 may be 90 degrees, so that the vertical light of the image light 50 is transmitted from the semi-reflection semi-transmission film 20 to the anti-dazzling liquid crystal screen 10.

A 5V voltage is loaded to the anti-dazzling liquid crystal screen 10, and the polarization state of the vertical light of the image light 50 is changed into horizontal light.

Since the absorption axis of the third polarizer 11 is 90 degrees, the horizontal light of the image light 50 is transmitted, and the image light 50 is exited from the anti-dazzling liquid crystal screen.

Thereby, the voltage loaded to the anti-dazzling liquid crystal screen is controlled to adjust the transmittance of the anti-dazzling unit to realize the display function.

Those skilled in the art may set appropriate reflectivity and transmittance according to a practical application requirement. Elaborations are omitted herein.

Figure 10:
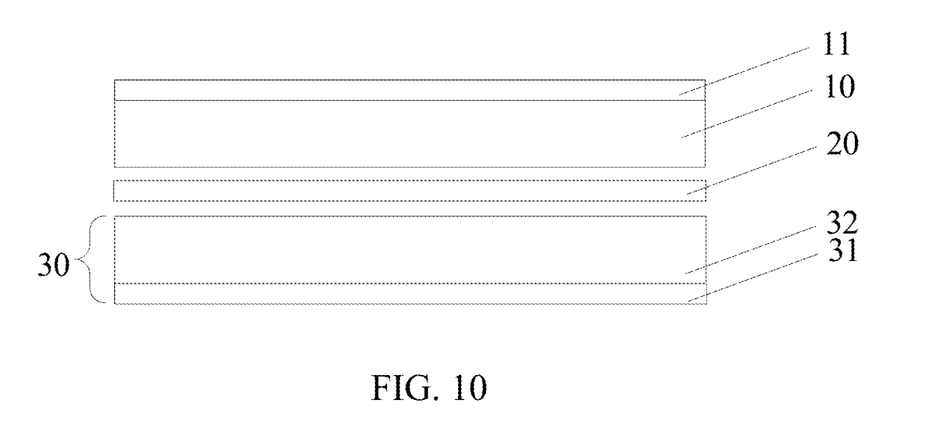
FIG. 10 is still another structural schematic diagram of an anti-dazzling display device according to an embodiment of the present disclosure.

Considering the characteristic of selective reflection and transmission of the semi-reflection semi-transmission film and reduction of the process cost and device cost of the anti-dazzling display device, in another optional embodiment, as shown in FIG. 10, the display unit 30 may consist of a display panel 32 and a first polarizer 31 on a side of the display panel 32 away from the semi-reflection semi-transmission film 20. The anti-dazzling liquid crystal screen 10 may further include a third polarizer 11 on a side of liquid crystal molecules in the anti-dazzling liquid crystal screen 10 away from the semi-reflection semi-transmission film 20. An absorption axis of the first polarizer 31 is the same as an absorption axis of the third polarizer 11. A transmission axis of the semi-reflection semi-transmission film 20 is the same as the absorption axis of the first polarizer 31. Therefore, the characteristic of selective reflection and transmission of the semi-reflection semi-transmission film is fully used. Since the absorption axis of the second polarizer is orthogonal to the transmission axis of the semi-reflection semi-transmission film, the second polarizer may be omitted.

For example, the image light 50 displayed by the display unit 30 enters the semi-reflection semi-transmission film 20. Since the transmission axis of the semi-reflection semi-transmission film 20 is 90 degrees, the vertical light of the image light 50 is transmitted from the semi-reflection semi-transmission film 20 to the anti-dazzling liquid crystal screen 10. That is, only the light parallel to the transmission axis of the semi-reflection semi-transmission film in the image light exited from the display panel may be transmitted. Therefore, the function of the second polarizer may be realized by using the semi-reflection semi-transmission film, the second polarizer may be omitted, and the process cost and device cost of the anti-dazzling display device are reduced.

An implementation process is similar to the abovementioned embodiment, and will not be elaborated herein.

Figure 11A:
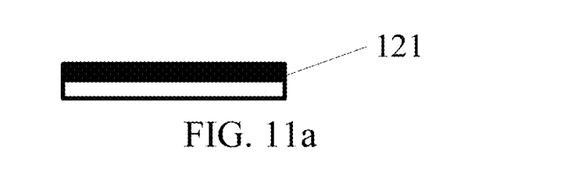
FIG. 11a is a structural schematic diagram of an electrode of an anti-dazzling liquid crystal screen according to an embodiment of the present disclosure.
Figure 11B:
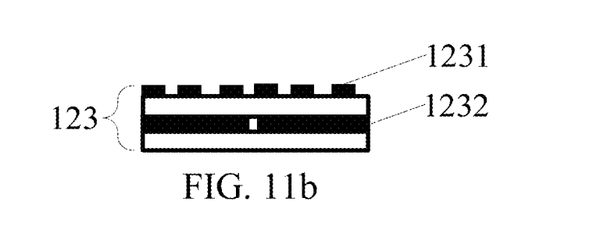
FIG. 11b is another structural schematic diagram of an electrode of an anti-dazzling liquid crystal screen according to an embodiment of the present disclosure.

In an optional embodiment, as shown in FIGS. 11a and 11b, the anti-dazzling liquid crystal screen may include a first substrate and second substrate which are on two sides of liquid crystal molecules in the anti-dazzling liquid crystal screen. The first substrate may include a first electrode region on the first substrate. The first electrode region may include a shield electrode 121 which may be on a side of the liquid crystal molecules away from the semi-reflection semi-transmission film. The second substrate may include a second electrode region on the first substrate. The second electrode region 123 may include a pixel electrode 1232, an insulating layer, and a common electrode 1231 which are stacked. The pixel electrode is on a side of the insulating layer close to the semi-reflection semi-transmission film. The common electrode is on a side of the insulating layer away from the semi-reflection semi-transmission film.

In an exemplary embodiment, as shown in FIG. 11a, the shield electrode 121 is configured to protect the liquid crystal molecules from the influence of static electricity. A twisted angle of the liquid crystal molecules is controlled through a row electrode located on the lower substrate. As shown in FIG. 11b, the second electrode region 123 may include a common electrode 1231 and a pixel electrode 1232. The common electrode 1231 is farther away from the semi-reflection semi-transmission film than the pixel electrode 1232. The anti-dazzling liquid crystal screen is configured to adjust the twisted angle of the liquid crystal molecules in response to a voltage loaded to the common electrode 1231 and the pixel electrode 1232 to implement the adjustment of the polarization state of the incident light.

Considering the simplification of process acts for manufacturing the anti-dazzling liquid crystal screen, in an optional embodiment, the anti-dazzling liquid crystal screen may include a first substrate and second substrate which are on two sides of liquid crystal molecules thereof. The first substrate may include a first electrode region on the first substrate. The first electrode region may include a shield electrode on a side of the liquid crystal molecules away from the semi-reflection semi-transmission film. The second substrate may include a second electrode region on the second substrate. The second electrode region may include a pixel electrode, an insulating layer, and a common electrode which are stacked. The pixel electrode is on a side of the insulating layer away from the semi-reflection semi-transmission film. The common electrode is on a side of the insulating layer close to the semi-reflection semi-transmission film.

Figure 12:
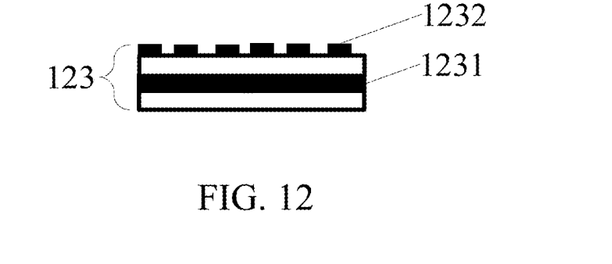
FIG. 12 is still another structural schematic diagram of an electrode of an anti-dazzling liquid crystal screen according to an embodiment of the present disclosure.

Like the abovementioned embodiment, the first electrode region includes a shield electrode. As shown in FIG. 12, the second electrode region 123 may include a common electrode 1231 and a pixel electrode 1232. The common electrode 1231 is closer to the semi-reflection semi-transmission film than the pixel electrode 1232. Therefore, one exposure, etching and development act may be omitted in a manufacturing process, the manufacturing process is effectively simplified, and the manufacturing cost is reduced. The anti-dazzling liquid crystal screen is configured to adjust a twisted angle of the liquid crystal molecule in response to a voltage loaded to the common electrode 1231 and the pixel electrode 1232 to implement the adjustment of the polarization state of the incident light.

Considering simultaneous use of the anti-dazzling state and the display state, in an optional embodiment, the anti-dazzling liquid crystal screen may include a first region and a second region other than the first region. The first region is configured to adjust the reflectivity of the incident ambient light in response to the light intensity of the ambient light sensed by the sensor unit. The second region is configured to adjust the transmittance of the image light exited from the display unit in response to the light intensity of the ambient light sensed by the sensor unit.

In such a manner, the anti-dazzling liquid crystal screen is divided into the first region and the second region for regional control, and different loaded voltages are set for the first region and second region of the anti-dazzling liquid crystal screen, such that the first region adjusts the reflectivity of the incident ambient light in response to the light intensity of the ambient light sensed by the sensor unit and the second region adjusts the transmittance of the image light exited from the display unit in response to the light intensity of the ambient light sensed by the sensor unit.

Here, a division ratio of the first region and the second region is not limited in the embodiments of the present disclosure, and may be set by those skilled in the art according to a practical application requirement. Elaborations are omitted herein.

In an optional embodiment, the anti-dazzling liquid crystal screen may be a twisted nematic liquid crystal display screen, and is configured to adjust a polarization state of the incident light in response to the loaded voltage.

Therefore, the twisted nematic liquid crystal display screen is combined with the semi-reflection semi-transmission film to implement light path control to realize the anti-dazzling function and the display function.

Figure 13A:
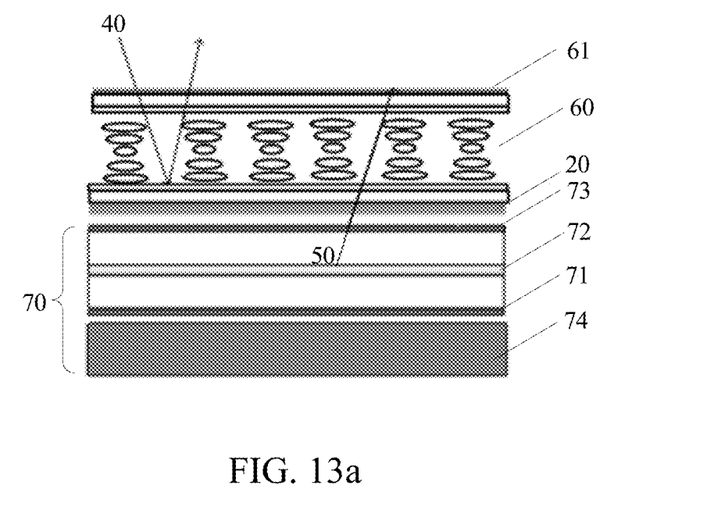
FIG. 13a is further still another structural schematic diagram of an anti-dazzling display device according to an embodiment of the present disclosure.
Figure 13B:
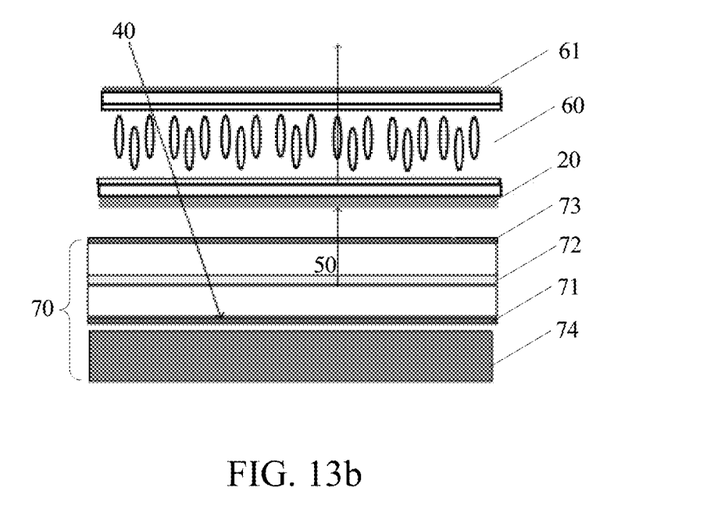
FIG. 13b is yet still another structural schematic diagram of an anti-dazzling display device according to an embodiment of the present disclosure.

In an optional embodiment, as shown in FIGS. 13a and 13b, the display unit 70 includes a display panel, a fourth polarizer 71 on a side of the display panel away from the semi-reflection semi-transmission film, and a fifth polarizer 73 on a side of the display panel close to the semi-reflection semi-transmission film. The anti-dazzling liquid crystal screen 60 may further include a sixth polarizer 61 on a side of liquid crystal molecules in the anti-dazzling liquid crystal screen 60 away from the semi-reflection semi-transmission film. An absorption axis of the fourth polarizer 71 is orthogonal to an absorption axis of the fifth polarizer 73. The absorption axis of the fifth polarizer 73 is parallel to an absorption axis of the sixth polarizer 61. A transmission axis of the half reflection half reflection film 20 is orthogonal to the absorption axis of the sixth polarizer.

For example, as shown in FIG. 13a, the display unit 70 may be a liquid crystal display screen, and includes a fourth polarizer 71, a liquid crystal display panel 72, a fifth polarizer 73, and a backlight 74. The anti-dazzling liquid crystal screen 60 may include a sixth polarizer 61. The anti-dazzling liquid crystal screen 60 is configured to present different states of liquid crystal molecules in response to different loaded voltages. As shown in FIG. 13a, when the voltage loaded to the anti-dazzling liquid crystal screen 60 is 0V, the liquid crystal molecule is parallel to a substrate, and the polarization state of the incident light is changed. As shown in FIG. 13b, when a certain voltage is loaded to the anti-dazzling liquid crystal screen 60 to form an electric field, the liquid crystal molecules are arranged along a direction of the electric field, and the polarization state of the incident light is not changed.

In an exemplary embodiment, the absorption axis of the fourth polarizer 71 may be 0 degree. The absorption axis of the fifth polarizer 73 may be 90 degrees. The absorption axis of the sixth polarizer 61 may be 90 degrees. The transmission axis of the semi-reflection semi-transmission film 20 may be 0 degree. Therefore, the fourth polarizer, the fifth polarizer, the anti-dazzling liquid crystal screen, and the sixth polarizer, may be combined with the semi-reflection semi-transmission film to implement light path control.

Here, the degrees of the absorption axis of the fourth polarizer, the degrees of the absorption axis of the fifth polarizer, the degrees of the absorption axis of the sixth polarizer, and the degrees of the transmission axis of the semi-reflection semi-transmission axis are not limited in the embodiments of the present disclosure. Those skilled in the art may take a design criterion in which a setting is made according to a practical application requirement to satisfy the light path control of the anti-dazzling display device. Elaborations are omitted herein.

In an exemplary embodiment, the twisted nematic liquid crystal display screen presents different states of the liquid crystal molecule in response to different loaded voltages. Descriptions are made still with the two extreme cases presented by the anti-dazzling unit.

For example, in the anti-dazzling state, as shown in FIG. 13a, on one aspect, the ambient light 40 enters the anti-dazzling liquid crystal screen 60 of the anti-dazzling display device.

According to the characteristic of a polarizer, light parallel to an absorption axis thereof is absorbed, and light perpendicular to the absorption axis thereof is transmitted. Here, the absorption axis of the sixth polarizer 61 may be 90 degrees, so that the sixth polarizer 61 may absorb vertical light of the ambient light 40 and transmit horizontal light of the ambient light 40.

The anti-dazzling liquid crystal screen 60 adjusts the polarization state of the incident light 40 into polarized light perpendicular to the transmission axis of the semi-reflection semi-transmission film 20. Considering the characteristic of the anti-dazzling liquid crystal screen, the voltage loaded to the anti-dazzling liquid crystal screen may be set to 0, namely, the polarization state of the horizontal light is changed, and the output first polarized light is the vertical light.

The transmission axis of the semi-reflection semi-transmission film 20 may be 0 degrees. According to the characteristic of selective reflection and transmission of the semi-reflection semi-transmission film 20, the first polarized light is the vertical light. In such case, the semi-reflection semi-transmission film realizes a reflection function, and reflects the vertical light.

The vertical light passes through the anti-dazzling liquid crystal screen again, and the polarization state of the vertical light is changed to the horizontal light.

The horizontal light may exit from the sixth polarizer 61 since the absorption axis of the sixth polarizer 61 is 90 degrees.

On the other aspect, the image light 50 displayed by the display unit 70 enters the fifth polarizer 73. The absorption axis of the fifth polarizer 73 is 90 degrees, so that vertical light of the image light 50 is absorbed, and horizontal light of the image light 50 is transmitted.

The transmission axis of the semi-reflection semi-transmission film 20 may be 0 degrees, so that the horizontal light of the image light 50 is transmitted from the semi-reflection semi-transmission film 20 to the anti-dazzling liquid crystal screen 60.

0V voltage may be loaded to the anti-dazzling liquid crystal screen 60, and the polarization state of the horizontal light of the image light 50 is changed into vertical light.

The absorption axis of the sixth polarizer 61 may be 90 degrees, so that the vertical light of the image light 50 is absorbed, and the image light 50 cannot exit from the anti-dazzling liquid crystal screen.

For another example, in the display state, as shown in FIG. 13b, on one aspect, the ambient light 40 enters the anti-dazzling liquid crystal screen 60 of the anti-dazzling display device.

The absorption axis of the sixth polarizer 61 may be 90 degrees, so that the sixth polarizer 61 absorbs vertical light of the ambient light 40 and transmits horizontal light of the ambient light 40.

The anti-dazzling liquid crystal screen 60 adjusts the polarization state of the incident light 40 into polarized light parallel to the transmission axis of the semi-reflection semi-transmission film 20. Considering the characteristic of the anti-dazzling liquid crystal screen, the voltage loaded to the anti-dazzling liquid crystal screen may be set to a certain voltage to form an electric field, and the liquid crystal molecules are arranged along the direction of the electric field, namely, the polarization state of the horizontal light is not changed, and the output first polarized light is the horizontal light.

The transmission axis of the semi-reflection semi-transmission film 20 may be 0 degree. According to the characteristic of selective reflection and transmission of the semi-reflection semi-transmission film 20, the first polarized light is the horizontal light. In such case, the semi-reflection semi-transmission film realizes a transmission function, and transmits the horizontal light.

The absorption axis of the fifth polarizer 73 may be 90 degrees, and the horizontal light is transmitted.

The horizontal light passes through the display panel and reaches the fourth polarizer.

The absorption axis of the fourth polarizer may be 0 degree, and the horizontal light is absorbed. In such case, the ambient light entering the anti-dazzling display device is completely absorbed.

On the other aspect, the image light 50 displayed by the display unit 70 enters the fifth polarizer 73. The absorption axis of the fifth polarizer 73 is 90 degrees, so that vertical light of the image light 50 is absorbed, and horizontal light of the image light 50 is transmitted.

The transmission axis of the semi-reflection semi-transmission film 20 may be 0 degrees, so that the horizontal light of the image light 50 is transmitted from the semi-reflection semi-transmission film 20 to the anti-dazzling liquid crystal screen 60.

A certain voltage may be loaded to the anti-dazzling liquid crystal screen 60 to form an electric field, the liquid crystal molecules are arranged along the direction of the electric field, and the polarization state of the horizontal light of the image light 50 is not changed.

The absorption axis of the sixth polarizer 61 may be 90 degrees, so that the horizontal light of the image light 50 is transmitted, and the image light 50 is exited from the anti-dazzling liquid crystal screen 60.

In such a manner, the image light 50 passes through the semi-reflection semi-transmission film 20 and the anti-dazzling liquid crystal screen 60 and is exited from the anti-dazzling liquid crystal screen 60, thereby realizing the display function. Moreover, since the sixth polarizer 11 of the anti-dazzling liquid crystal screen 60 absorbs the vertical light of the incident ambient light 40, and the third polarizer 71 of the display unit absorbs the remaining incident ambient light, and the exited image light is not influenced.

Those skilled in the art may set appropriate reflectivity and transmittance according to a practical application requirement. Elaborations are omitted herein.

Considering the characteristic of selective reflection and transmission of the semi-reflection semi-transmission film and reduction of the process cost and device cost of the anti-dazzling display device, in another optional embodiment, the display unit may consist of a display panel and a fourth polarizer on a side of the display panel away from the semi-reflection semi-transmission film. The anti-dazzling liquid crystal screen may further include a sixth polarizer on a side of liquid crystal molecules in the anti-dazzling liquid crystal screen away from the semi-reflection semi-transmission film. An absorption axis of the fourth polarizer is orthogonal to an absorption axis of the sixth polarizer. A transmission axis of the semi-reflection semi-transmission film is orthogonal to the absorption axis of the sixth polarizer. Therefore, the characteristic selective reflection and transmission of the semi-reflection semi-transmission film is fully used. Since the absorption axis of the fifth polarizer is orthogonal to the transmission axis of the semi-reflection semi-transmission film, the fifth polarizer is omitted.

For example, the image light 50 displayed by the display unit 70 enters the semi-reflection semi-transmission film 20. Since the transmission axis of the semi-reflection semi-transmission film 20 is 0 degree, the vertical light in the image light 50 is transmitted from the semi-reflection semi-transmission film 20 to the anti-dazzling liquid crystal screen 60. That is, only the light parallel to the transmission axis of the semi-reflection semi-transmission film 20 in the image light exited from the display panel may be transmitted. Therefore, the function of the fifth polarizer may be realized using the semi-reflection semi-transmission film, and the fifth polarizer is omitted to reduce the process cost and device cost of the anti-dazzling display device.

An implementation process is similar to the abovementioned embodiment, and will not be elaborated herein.

Based on the abovementioned anti-dazzling display device, an embodiment of the present disclosure also provides an interior rearview mirror, which includes the abovementioned anti-dazzling display device.

In an exemplary embodiment, the interior rearview mirror includes the abovementioned anti-dazzling display device. A light intensity of ambient light is sensed through the sensor unit in the anti-dazzling display device, and light path control is performed on ambient light entering the anti-dazzling unit and image light exited from the display unit through the anti-dazzling unit. As such, under the condition of dazzling ambient light, according to the detected ambient light, the reflectivity may be adjusted to reduce the reflection of the incident ambient light, and the transmittance may be adjusted to display the image light. Therefore, the viewing experience of a driver and the driving safety are improved.

Corresponding to the anti-dazzling display device provided in the abovementioned embodiments, an embodiment of the present disclosure also provides an anti-dazzling display method based on the abovementioned anti-dazzling display device. Since the anti-dazzling display method provided in the embodiment of the present disclosure corresponds to the anti-dazzling display device provided in the several abovementioned embodiments, the foregoing implementation modes are also applicable to the anti-dazzling display method provided in the present embodiment. Here, detailed descriptions are omitted in the embodiment of the present disclosure.

Figure 14:
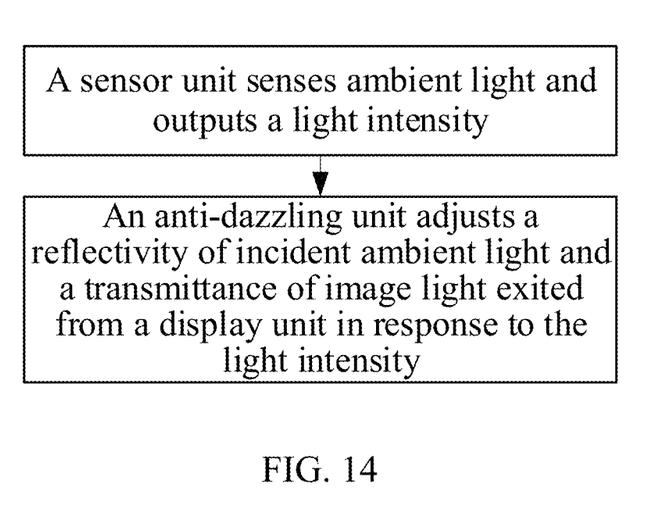
FIG. 14 is a flowchart of an anti-dazzling display method according to an embodiment of the present disclosure.

As shown in FIG. 14, an embodiment of the present disclosure also provides an anti-dazzling display method based on the abovementioned anti-dazzling display device, which may include that: a sensor unit senses ambient light and outputs a light intensity; and an anti-dazzling unit adjusts the reflectivity of the incident ambient light and the transmittance of image light exited from the display unit in response to the light intensity.

Accordingly, the light intensity of the ambient light is sensed through the sensor unit, and light path control is performed on the ambient light entering the anti-dazzling unit and the image light exited from the display unit through the anti-dazzling unit. As such, under the condition of dazzling ambient light, the reflectivity may be adjusted to reduce the reflection of the incident ambient light, and the transmittance may be adjusted to display the image light. Therefore, the viewing experience of a driver and the driving safety are improved. Details about an implementation mode refer to the abovementioned embodiments. Elaborations are omitted herein.

In an optional embodiment, the anti-dazzling unit may include an anti-dazzling liquid crystal screen and a semi-reflection semi-transmission film which is between the anti-dazzling liquid crystal screen and the display unit. In such case, before the sensor unit senses the ambient light and outputs the light intensity, the anti-dazzling display method may further include that: a preset voltage is loaded to the anti-dazzling liquid crystal screen to make the anti-dazzling liquid crystal screen be in a balance state of the reflectivity and the transmittance.

Accordingly, a control voltage corresponding to a balance point of the reflectivity and the transmittance is set as a preset voltage for the anti-dazzling unit and an influence trend of the loaded voltage on the reflectivity and the transmittance. The preset voltage is loaded to the anti-dazzling liquid crystal screen at the initial moment to make the anti-dazzling liquid crystal screen in the balance state, that is, the anti-dazzling liquid crystal screen is configured to realize the best anti-dazzling function and display function in an ordinary environment. Details about an implementation mode refer to the abovementioned embodiment. Elaborations are omitted herein.

According to the anti-dazzling display device and anti-dazzling display method provided in the embodiments of the present disclosure, through the anti-dazzling unit, the display unit, and the sensor unit, the reflectivity of the anti-dazzling unit may be adjusted according to the light intensity of the ambient light to reduce the light intensity of the incident ambient light, thereby realizing the anti-dazzling function. The transmittance of the anti-dazzling unit may be adjusted to transmit the image light exited from the display unit, thereby realizing the display function. The problem in a conventional art can be solved, the viewing experience of the driver can be effectively improved, the driving safety can further be improved. Therefore, the anti-dazzling display device and anti-dazzling display method provided in the embodiments of the present disclosure have a broad application prospect.

Clearly, the abovementioned embodiment of the present disclosure is only an example for clearly describing the present disclosure and not intended to limit the implementation modes of the present disclosure. Those of ordinary skill in the art may further make variations or modifications with other different forms based on the above description. Not all implementation modes may be exhaustively listed herein. Any variations or modifications derived from the technical solutions of the present disclosure still fall within the scope of protection of the present disclosure.

What is claimed is:

1. An anti-dazzling display device, comprising a sensor unit, a display unit, and an anti-dazzling unit on a light exit side of the display unit, wherein
the anti-dazzling unit is configured to adjust a reflectivity of incident ambient light and a transmittance of image light exited from the display unit in response to a light intensity of ambient light sensed by the sensor unit;
wherein the anti-dazzling unit comprises an anti-dazzling liquid crystal screen and a semi-reflection semi-transmission film, wherein the semi-reflection semi-transmission film is between the anti-dazzling liquid crystal screen and the display unit;
wherein the anti-dazzling liquid crystal screen is configured to adjust a polarization state of incident light in response to a loaded voltage; the display unit comprises a display panel, a first polarizer on a side of the display panel away from the semi-reflection semi-transmission film, and a second polarizer on a side of the display panel close to the semi-reflection semi-transmission film, and the anti-dazzling liquid crystal screen comprises a third polarizer on a side of liquid crystal molecules in the anti-dazzling liquid crystal screen away from the semi-reflection semi-transmission film, wherein an absorption axis of the first polarizer is orthogonal to an absorption axis of the second polarizer, the absorption axis of the second polarizer is orthogonal to an absorption axis of the third polarizer, and a transmission axis of the half reflection half reflection film is orthogonal to the absorption axis of the second polarizer; or, the display unit consists of a display panel and a first polarizer on a side of the display panel away from the semi-reflection semi-transmission film, and the anti-dazzling liquid crystal screen further comprises a third polarizer on a side of liquid crystal molecules of the anti-dazzling liquid crystal screen away from the semi-reflection semi-transmission film, wherein an absorption axis of the first polarizer is the same as an absorption axis of the third polarizer, and a transmission axis of the semi-reflection semi-transmission film is the same as the absorption axis of the first polarizer; or,
wherein the anti-dazzling liquid crystal screen is a twisted nematic liquid crystal display screen, and is configured to adjust a polarization state of incident light in response to a loaded voltage; the display unit comprises a display panel, a fourth polarizer on a side of the display panel away from the semi-reflection semi-transmission film, and a fifth polarizer on a side of the display panel close to the semi-reflection semi-transmission film, and the anti-dazzling liquid crystal screen further comprises a sixth polarizer on a side of liquid crystal molecules in the anti-dazzling liquid crystal screen away from the semi-reflection semi-transmission film, wherein an absorption axis of the fourth polarizer is orthogonal to an absorption axis of the fifth polarizer, the absorption axis of the fifth polarizer is parallel to an absorption axis of the sixth polarizer, and a transmission axis of the half reflection half reflection film is orthogonal to the absorption axis of the sixth polarizer; or, the display unit consists of a display panel and a fourth polarizer on a side of the display panel away from the semi-reflection semi-transmission film, and the anti-dazzling liquid crystal screen further comprises a sixth polarizer on a side of liquid crystal molecules in the anti-dazzling liquid crystal screen away from the semi-reflection semi-transmission film, wherein an absorption axis of the fourth polarizer is orthogonal to an absorption axis of the sixth polarizer, and a transmission axis of the semi-reflection semi-transmission film is orthogonal to the absorption axis of the sixth polarizer;
wherein in an anti-dazzling state, the reflectivity of the incident ambient light is controlled to reduce a light intensity of the incident ambient light, thereby realizing an anti-dazzling function; and in a display state, the transmittance of the image light exited from the display unit is controlled to implement a transmission of the image light, thereby realizing a display function.

2. The anti-dazzling display device according to claim 1, wherein the anti-dazzling liquid crystal screen is configured to be loaded with a preset voltage at an initial moment to be in a balance state of the reflectivity and the transmittance.

3. The anti-dazzling display device according to claim 2, wherein the sensor unit comprises a first light-sensitive sensor, a second light-sensitive sensor, and a first controller;

the first light-sensitive sensor is on a light exit side of the anti-dazzling unit;

the second light-sensitive sensor is on a side of the display unit away from the semi-reflection semi-transmission film; and the first controller is configured to control a voltage loaded to the anti-dazzling liquid crystal screen according to a light intensity sensed by the first light-sensitive sensor and a light intensity sensed by the second light-sensitive sensor to control the reflectivity and the transmittance.

4. The anti-dazzling display device according to claim 3, wherein the sensor unit comprises a third light-sensitive sensor and a second controller;

the third light-sensitive sensor is on a light exit side of the anti-dazzling unit; and the second controller is configured to control a voltage loaded to the anti-dazzling liquid crystal screen according to a light intensity sensed by the third light-sensitive sensor to control the reflectivity and the transmittance.

5. The anti-dazzling display device according to claim 1, wherein the anti-dazzling liquid crystal screen further comprises a first substrate and second substrate which are on two sides of liquid crystal molecules in the anti-dazzling liquid crystal screen;

the first substrate comprises a first electrode region comprising a shield electrode on a side of the liquid crystal molecules away from the semi-reflection semi-transmission film; and the second substrate comprises a second electrode region comprising a pixel electrode, an insulating layer, and a common electrode which are stacked, wherein the pixel electrode is on a side of the insulating layer close to the semi-reflection semi-transmission film, and the common electrode is on a side of the insulating layer away from the semi-reflection semi-transmission film; or, the pixel electrode is on a side of the insulating layer away from the semi-reflection semi-transmission film, and the common electrode is on a side of the insulating layer close to the semi-reflection semi-transmission film.

6. The anti-dazzling display device according to claim 1, wherein the anti-dazzling liquid crystal screen further comprises a first region and a second region except the first region;

the first region is configured to adjust the reflectivity of the incident ambient light in response to the light intensity of the ambient light sensed by the sensor unit; and the second region is configured to adjust the transmittance of the image light exited from the display unit in response to the light intensity of the ambient light sensed by the sensor unit.

7. An anti-dazzling display method based on the anti-dazzling display device according to claim 1, comprising:

sensing, by the sensor unit, ambient light, and outputting a light intensity; and adjusting, by the anti-dazzling unit, the reflectivity of the incident ambient light and the transmittance of image light exited from the display unit in response to the light intensity.

8. The anti-dazzling display method according to claim 7, wherein the anti-dazzling unit comprises an anti-dazzling liquid crystal screen and a semi-reflection semi-transmission film, the semi-reflection semi-transmission film is between the anti-dazzling liquid crystal screen and the display unit; and before the sensor unit senses the ambient light and outputs the light intensity, the anti-dazzling display method further comprises:

loading a preset voltage to the anti-dazzling liquid crystal screen to make the anti-dazzling liquid crystal screen be in a balance state of the reflectivity and the transmittance.

9. An interior rearview mirror, comprising the anti-dazzling display device according to claim 1.

* * * * *